US006416186B1

(12) United States Patent
Nakamura

(10) Patent No.: US 6,416,186 B1
(45) Date of Patent: Jul. 9, 2002

(54) PROJECTION DISPLAY UNIT

(75) Inventor: Nobutatsu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 128 days.

(21) Appl. No.: 09/642,093

(22) Filed: Aug. 21, 2000

(30) Foreign Application Priority Data

Aug. 23, 1999 (JP) .......................................... 11-236187

(51) Int. Cl.$^7$ ............................................. G03B 21/00
(52) U.S. Cl. ......................................... 353/69; 353/70
(58) Field of Search ........................... 353/69, 70, 122; 348/745, 746, 806; 345/647, 643

(56) References Cited

U.S. PATENT DOCUMENTS

| 5,465,121 A | * | 11/1995 | Blalock et al. | ............. | 348/744 |
| 5,548,357 A | * | 8/1996 | Appel et al. | .................. | 353/69 |
| 5,664,858 A | * | 9/1997 | Woo | ............. | 353/69 |
| 5,752,758 A | * | 5/1998 | Woo | ............. | 353/69 |
| 5,795,046 A | * | 8/1998 | Woo | ............. | 353/69 |
| 6,305,805 B1 | * | 10/2001 | Liebenow | .................. | 353/69 |

FOREIGN PATENT DOCUMENTS

JP 9-275538 10/1921

* cited by examiner

Primary Examiner—William Dowling
(74) Attorney, Agent, or Firm—Foley & Lardner

(57) ABSTRACT

A projection display unit, in which a distortion of an image is corrected even when the image is projected from an arbitrary direction, further which can correct a distortion caused by that an image is projected on a screen surface having an irregular surface or a free surface, is provided. The projection display unit provides an image inputting means to which an original image is inputted, a screen surface obtaining means for obtaining a three dimensional shape of a screen surface by calculating an azimuth angle, a tilt angle, and a distance of the screen surface for the projection display unit by using the normal line vector of the screen surface, an image correcting means for executing an inclination correction and a zooming in/out correction for the original image corresponding to the three dimensional shape of the screen surface, and an image outputting means for outputting the corrected image as a projecting image.

10 Claims, 9 Drawing Sheets

F I G. 1
PRIOR ART
ORIGINAL IMAGE (a)
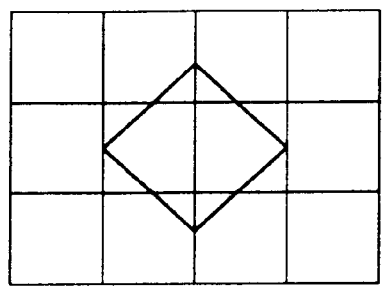
VERTICALLY COMPRESSED IMAGE (b)
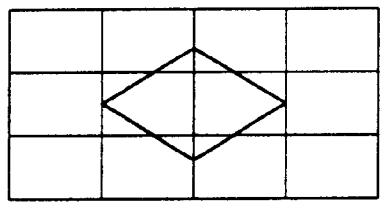
KEYSTONE DISTORTION CORRECTED IMAGE (c)
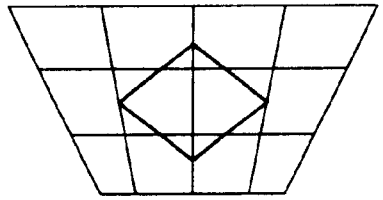
DISPLAYING IMAGE (d)
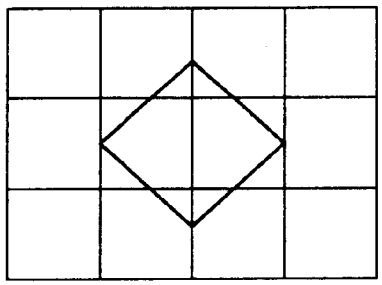

F I G. 6
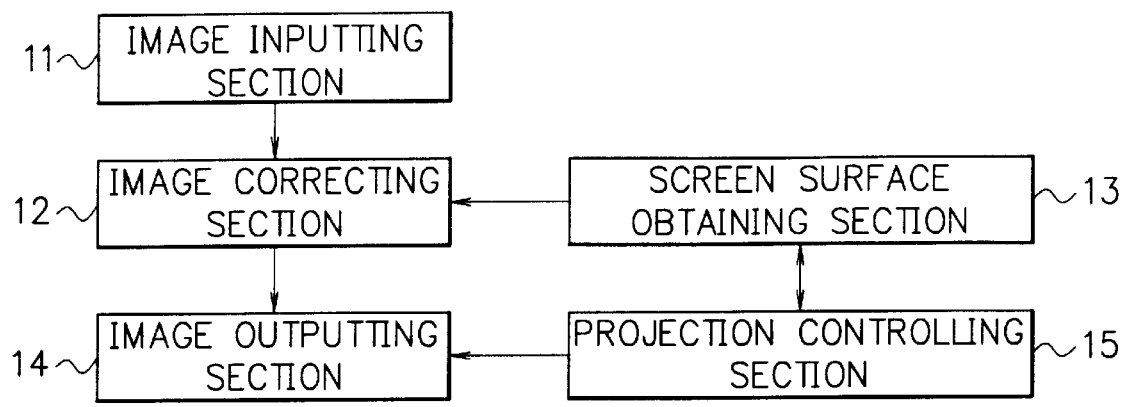
F I G. 7
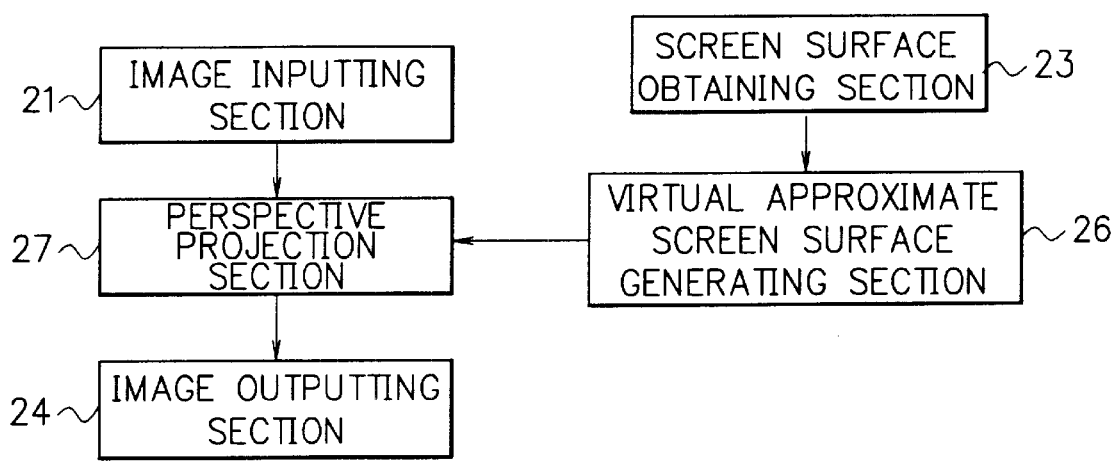

PROJECTION DISPLAY UNIT

BACKGROUND OF THE INVENTION

The present invention relates to a projection display unit that can project an image whose distortion is corrected.

DESCRIPTION OF THE RELATED ART

At a projection display unit, an image formed on such as a liquid crystal display (LCD) panel is taken out by transmitted through or reflected the LCD panel and the taken out image is projected on a screen surface. And when the image is projected on the screen surface, in order to make the zooming in/out rate of the image uniform in each part of the screen surface, the optical axis of the projection display unit must be perpendicularly intersected with the center of the screen surface. However, in case of a front projection display unit, the front projection display unit is disposed around the center position of a projection room in front of the screen surface, consequently the front projection display unit becomes an obstacle for observers to watch the screen surface. And at a rear projection display unit, there is a case that disposing the rear projection display unit at an ideal position becomes impossible caused by some limitation of the space of the projection room. Consequently, the projection display unit must be disposed in a state that the optical axis of the projection display unit is inclined for the screen surface, in this case, a distortions is generated in the projected image.

In order to solve this problem, Japanese Patent Application Laid-Open No. HEI 9-275538 discloses a liquid crystal projection display unit. FIG. 1 is a diagram showing an image correction method of this conventional projection display unit. As shown in FIG. 1, at this conventional projection display unit, an original image (a) is vertically compressed and the vertically compressed image (b) is formed. And further a keystone distortion correction is applied to the vertically compressed image (b), and a keystone distortion corrected image (c) is formed. And this keystone distortion corrected image (c) is projected to a vertically disposed screen surface from an inclined upper direction, and a displaying image (d) whose distortion is corrected can be projected on the screen surface.

At the conventional projection display unit shown in FIG. 1, only the vertical compression and the keystone distortion correction are applied, therefore, the distortion caused by that the image is projected from an upward, downward, right, or left direction can be corrected. However, there is a problem that the distortion caused by that the image is projected from an inclined right upward, inclined right downward, inclined left upward, or inclined left downward direction can not be corrected. Further, it is difficult to solve the distortion caused by that the screen surface is not a regular surface such as an irregular surface or a free surface by only applying the vertical compression and the keystone distortion correction.

SUMMARY OF THE INVENTION

It is therefore an object of the present invention to provide a projection display unit in which a distortion of an image is corrected even when the image is projected from an arbitrary direction, further which can correct a distortion caused by that an image is projected on a screen surface having an irregular surface or a free surface.

According to a first aspect of the present invention, for achieving the objects mentioned above, a projection display unit provides an image inputting means to which an original image is inputted, a screen surface obtaining means for obtaining a three dimensional shape of a screen surface by calculating an azimuth angle, a tilt angle, and a distance of the screen surface for the projection display unit by using the normal line vector of the screen surface, an image correcting means for executing an inclination correction and a zooming in/out correction for the original image corresponding to the three dimensional shape of the screen surface, and an image outputting means for outputting the corrected image as a projecting image.

According to a second aspect of the present invention, in the first aspect, the inclination correction makes the original image rotate corresponding to the inclination of the screen surface, and also makes the size of the original image change corresponding to the ratio between the distance of the screen surface and a focal distance of lens of the projection display unit, and makes the coordinate of the original image projected on a tentative reference surface change corresponding to the distance and the inclination of the screen surface, and the zooming in/out correction makes the coordinate of the original image change corresponding to the ratio between the distance from the center of the projection display unit to a reference surface and the distance from the center of the projection display unit to the tentative reference surface.

According to a third aspect of the present invention, in the first aspect, the projection display unit further provides a projection controlling means which calculates the focal distance of the lens of the projection display unit corresponding to the distance of the screen surface calculated at the screen surface obtaining means and controls the focus in the image outputting means.

According to a fourth aspect of the present invention, in the third aspect, the inclination correction is executed by the focal distance calculated at the projection controlling means.

According to a fifth aspect of the present invention, a projection display unit provides an image inputting means to which an original image is inputted, a screen surface obtaining means for obtaining a three dimensional shape of a screen surface by calculating an azimuth angle, a tilt angle, and a distance of the screen surface for the projection display unit by using the normal line vector of the screen surface, a virtual approximate screen surface generating means for generating a virtual approximate screen surface by using the three dimensional shape of the screen surface calculated at the screen surface obtaining means, a perspective projection means for calculating a corrected image by orthographic projection of a three dimensional image which is obtained by that a projection simulation is applied to the inputted original image on the virtual approximate screen surface by a perspective projection process, and an image outputting means for outputting the corrected image as a projecting image.

According to a sixth aspect of the present invention, in the fifth aspect, the virtual approximate screen surface is obtained by that the coordinate of the screen surface is rotated by the inclination of the screen surface, and a directional vector of the coordinate from the center of the projection display unit is obtained, and an angle between the directional vector and an optical axis of the projection display unit is obtained, and a process for calculating three dimensional coordinate of the position of the virtual approximate screen surface of the coordinate is applied to all coordinates, and a three dimensional polygon connected each coordinate of the virtual approximate screen surface is generated.

According to a seventh aspect of the present invention, a projection display unit provides an image inputting means to which an original image is inputted, an image outputting means which outputs an image that the original image is processed as a projecting image, a projection controlling means which changes over an image inputting to the image outputting means, a pattern image generating means which generates pattern images and outputs the pattern images, a screen surface obtaining means which obtains a shape of a screen surface by that by using the pattern images and images on the screen surface at the time when the pattern images are inputted to the image outputting means and are taken by a camera, and by obtaining three dimensional coordinates of the positions projected the pattern images by using a triangulation method with making the coordinate of the projection display unit correspond to the coordinate of camera images being the pattern images taken, and an image correcting means which executes an inclination correction and a zooming in/out correction for the inputted original image corresponding to the shape of the screen surface and inputs the corrected image to the image outputting means.

According to an eighth aspect of the present invention, a projection display unit provides an image inputting means to which an original image is inputted, an image outputting means which outputs an image that the original image is processed as a projecting image, a projection controlling means which has data of the position and direction of the projection display unit in a projection room and controls the data, a projection room inside shape data base in which shape data inside the projection room are stored, a screen surface obtaining means which obtains a shape of a screen surface by converting the shape data inside projection room obtained from the projection room inside shape data base corresponding to the position and direction data of the projection display unit, and an image correcting means which executes an inclination correction and a zooming in/out correction for the inputted original image corresponding to the shape of the screen surface and inputs the corrected image to the image outputting means.

According to a ninth aspect of the present invention, a projection display unit provides an image inputting means to which an original image is inputted, an image outputting means which outputs an image that the original image is processed as a projecting image, a marker detecting means for detecting markers provided inside a projection room, a projection room inside shape data base in which shape data inside the projection room are stored, a screen surface obtaining means which obtains a shape of a screen surface by converting the shape data inside projection room obtained from the projection room inside shape data base corresponding to the position and direction data of the projection display unit based on a detected result at the marker detecting means, and an image correcting means which executes an inclination correction and a zooming in/out correction for the inputted original image corresponding to the shape of the screen surface and inputs the corrected image to the image outputting means.

According to a tenth aspect of the present invention, a projection display unit provides an image inputting means to which an original image is inputted, an image outputting means which outputs an image that the original image is processed as a projecting image, a marker detecting means for detecting markers provided at the projection display unit itself, a projection room inside shape data base in which shape data inside the projection room are stored, a screen surface obtaining means which obtains a shape of a screen surface by converting the shape data inside projection room obtained from the projection room inside shape data base corresponding to the position and direction data of the projection display unit based on a detected result at the marker detecting means, and an image correcting means which executes an inclination correction and a zooming in/out correction for the inputted original image corresponding to the shape of the screen surface and inputs the corrected image to the image outputting means.

According to the present invention, in order to correct a distortion of an image to be projected at a projection display unit, a three dimensional shape of a screen surface is obtained, and parameters for correction are controlled based on the three dimensional shape of the screen surface. In this, the three dimensional shape of the screen surface signifies that the inclination and distance of the screen surface for the projection display unit. That is, the distortion of the image to be projected is corrected corresponding to the direction and distance of the screen surface for the projection display unit. Furthermore, the projection display unit of the present invention recognizes not only the inclination and distance of the screen surface, but also the shape of a screen surface being an irregular surface or a free surface, and the distortion is corrected. Therefore, according to the present invention, not only a distortion caused by that an image is projected on the screen surface from an arbitrary direction can be corrected, but also a distortion caused by that an image is projected on a screen that has an irregular surface or a free surface can be corrected.

BRIEF DESCRIPTION OF THE DRAWINGS

The objects and features of the present invention will become more apparent from the consideration of the following detailed description taken in conjunction with the accompanying drawings in which:

FIG. 1 is a diagram showing an image correction method of a conventional projection display unit;

FIG. 6 is a block diagram showing a second embodiment of the projection display unit of the present invention;

FIG. 7 is a block diagram showing a third embodiment of the projection display unit of the present invention;

DESCRIPTION OF THE PREFERRED EMBODIMENTS

Figure 2:
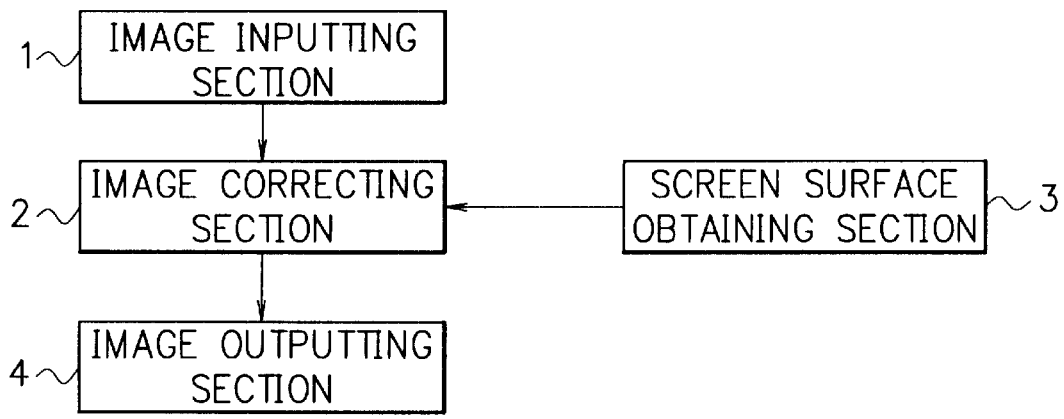
FIG. 2 is a block diagram showing a first embodiment of a projection display unit of the present invention.

Referring now to the drawings, embodiments of the present invention are explained in detail. Actually a projection display unit has a plurality of lenses for projecting a color image, however, at the explanation of the embodiments of the present invention, in order to make the explanation concise, the embodiments are explained by using one lens.

Figure 3:
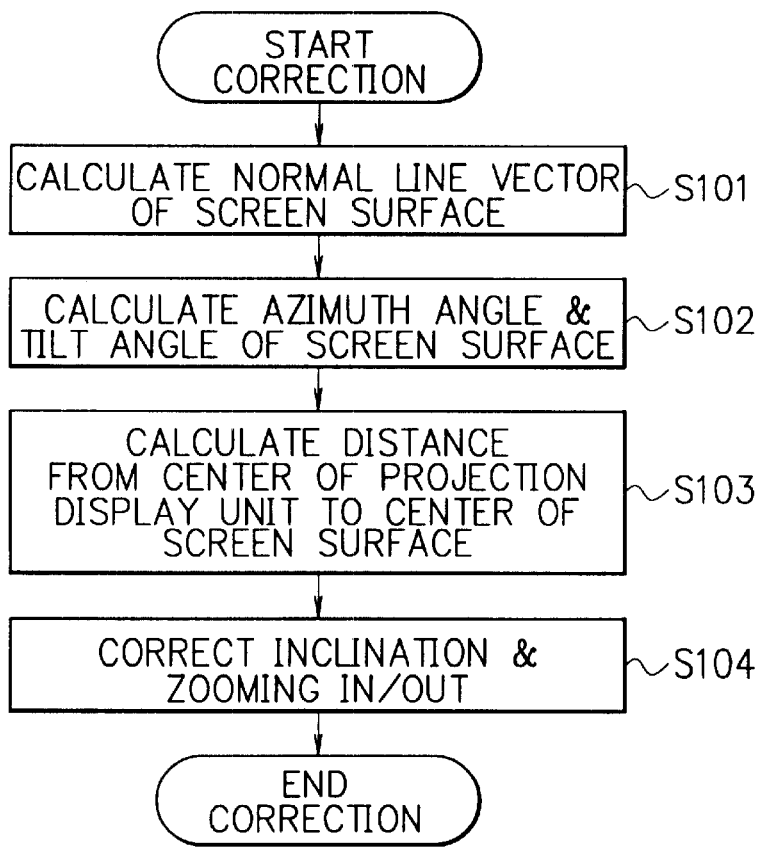
FIG. 3 is a flowchart showing correction processes of the first embodiment of the projection display unit of the present invention.
Figure 4:
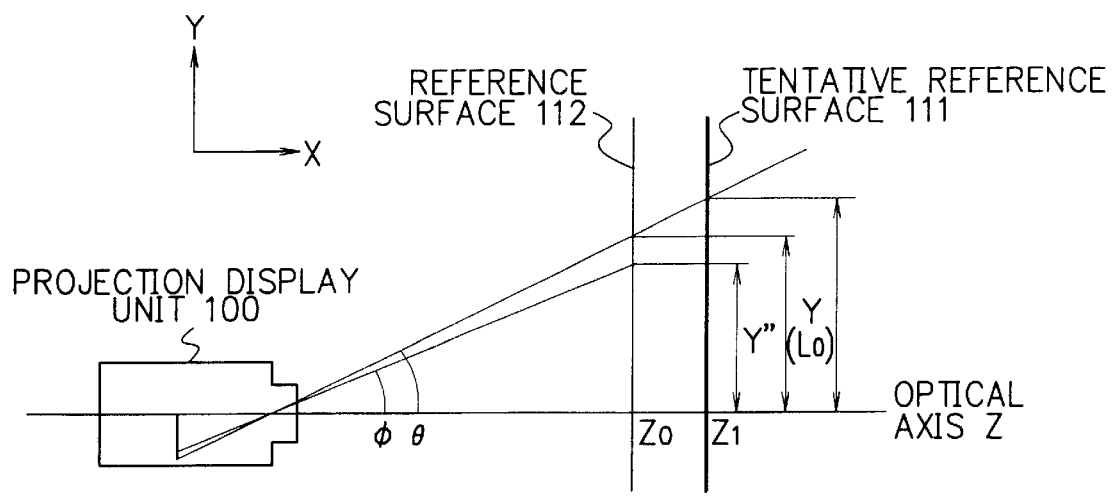
FIG. 4 is a diagram showing zooming in/out correction operation at the first embodiment of the projection display unit of the present invention.
Figure 5:
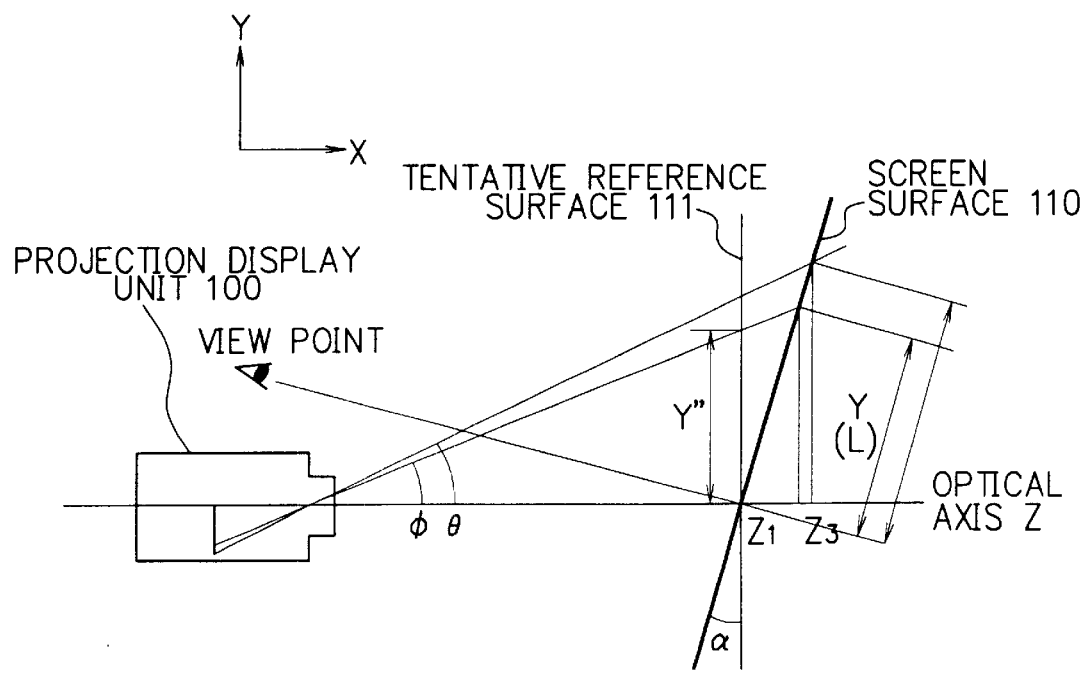
FIG. 5 is a diagram showing inclination correction operation at the first embodiment of the projection display unit of the present invention.

First, a first embodiment of a projection display unit of the present invention is explained. FIG. 2 is a block diagram showing the first embodiment of the projection display unit of the present invention. FIG. 3 is a flowchart showing correction processes of the first embodiment of the projection display unit of the present invention. FIG. 4 is a diagram showing zooming in/out correction operation at the first embodiment of the projection display unit of the present invention. FIG. 5 is a diagram showing inclination correction operation at the first embodiment of the projection display unit of the present invention. As shown in FIG. 2, the first embodiment of the projection display unit of the present invention consists of an image inputting section 1, an image correcting section 2, a screen surface obtaining section 3, and an image outputting section 4. An original image is inputted to the image inputting section 1. The image correcting section 2 executes a distortion correction for the original image. The screen surface obtaining section 3 obtains information of a three dimensional shape of a screen surface. The image outputting section 4 outputs an image whose distortion is corrected as a projecting image. In this, a well known three dimensional shape measuring instrument can be used as the screen surface obtaining section 3 and this instrument is not directly related to the main part of the present invention. Therefore the detailed explanation concerning this three dimensional measurement is omitted.

Referring to FIG. 2, operation of the first embodiment of the projection display unit of the present invention is explained. An original image is inputted to the image inputting section 1, and the image correcting section 2 applies a distortion correction to the inputted original image by using information from the screen surface obtaining section 3. At this time, the screen surface obtaining section 3 obtains a three dimensional shape of a screen surface. The three dimensional shape of an arbitrary surface of the screen surface can be expressed by three parameters, that is, an azimuth angle, a tilt angle, and a distance. In this, the azimuth angle signifies an angle that the surface of the screen horizontally rotates for the vertical surface including an optical axis of the projection display unit. And the tilt angle signifies an angle that the surface of the screen vertically rotates for the vertical surface including the optical axis of the projection display unit. And the distance signifies a distance from the center of the projection display unit (the center signifies the center of lens) to the center of the screen surface. The screen surface obtaining section 3 calculates the three parameters of the azimuth angle, the tilt angle, and the distance of the screen surface shape by measuring the surface of the screen.

Next, referring to FIG. 3, correction processes of the first embodiment of the projection display unit of the present invention are explained. At the time when the correction processes are started, the screen surface obtaining section 3 calculates a normal line vector of the screen surface (step S101). The normal line vector of the screen surface is calculated by measuring at least three positions on the screen surface. Next, the screen surface obtaining section 3 calculates the azimuth angle and the tilt angle of the screen surface from the normal line vector (step S102). In this, the optical axis of the projection display unit is defined as Z axis, the upward perpendicular direction to the Z axis is defined as Y axis, and the perpendicular direction to the Z and Y axes is defined as X axis. And in case that the normal line vector is calculated as (a, b, c) in the defined coordinate, the azimuth angle is calculated by $\tan^{-1}(b/a)$, and the tilt angle is calculated by $\tan^{-1}(c/\sqrt{(a^2+b^2)})$. The screen surface obtaining section 3 calculates the distance from the center of the projection display unit to the center of the screen surface by obtaining the intersection of the optical axis of the projection display unit and the screen surface (step S103). And the image correcting section 2 executes an inclination correction and a zooming in/out correction (step S104).

FIGS. 4 and 5 are sectional views being that the projection display unit and the screen surface are sectioned at a plane in which the optical axis of the projection display unit and the normal line vector of the screen surface are included. In FIGS. 4 and 5, a reference surface 112 is a surface being a reference from a projection display unit 100, and the image is projected on a screen 110 by that the image is corrected to project on the reference surface 112. In this, a tentative reference surface 111 is defined to be parallel to the reference surface 112 and a plane which passes through the intersection of the optical axis of the projection display unit 100 and the screen surface 110.

In FIG. 4, the distance from the projection display unit 100 to the reference surface 112 is defined as $Z_0$ and the distance from the projection display unit 100 to the tentative reference surface 111 is defined as $Z_1$. At this time, in order to make a Y axis value $L_0$ on the reference surface 112 project on the same Y axis value $L_0$ on the tentative reference surface 111, the Y axis value on the tentative reference surface 111 must be multiplied by $Z_0/Z_1$, that is, $Y''=Y \times Z_0/Z_1$ is needed. This calculation is a simple zooming in/out calculation, the same calculation is applied to an X axis value.

Further, in FIG. 5, in order to make a Y axis value L on the tentative reference surface 111 project on the same Y axis value L of the screen surface 110, the Y axis value on the screen surface 110 must be multiplied by $\tan\theta/\tan 0$, that is, $Y''=Y \times \tan\theta/\tan\phi = Y \times Z_1 \times \cos\alpha/(Z_1+Y\times\sin\alpha)$ is needed. For an X axis value, the length of the original image must be expressed at the position of the distance Z3, therefore $X''=X \times Z_1/(Z_1+Y\times\sin\alpha)$.

As mentioned above, in order to correct an image, the image is rotated by the azimuth angle, and the zooming in/out is applied to the image by using the distances $Z_0$ being the distance from the projection display unit 100 to the reference surface 112 and the distance $Z_1$ being the distance from the projection display unit 100 to the tentative reference surface 111. And the correction corresponding to the tilt angle $\alpha$ of the screen surface 110 is executed by the correction $(X', Y')=(k\times X, k\times\cos\alpha\times Y)$, in this, $k=Z_1/(Z_1+Y\times\sin\alpha)$. And the image correction is finished. As mentioned above, by these corrections, even an image is projected from an arbitrary angle for the screen surface 110, the image whose distortions are corrected can be projected.

Next, a second embodiment of the projection display unit of the present invention is explained. FIG. 6 is a block diagram showing the second embodiment of the projection display unit of the present invention. As shown in FIG. 6, the second embodiment of the projection display unit of the present invention consists of an image inputting section 11, an image correcting section 12, a screen surface obtaining section 13, an image outputting section 14, and a projection controlling section 15. The functions of the image inputting section 11, the image correcting section 12, and the screen surface obtaining section 13 are the same as those of the image inputting section 1, the image correcting section 2, and the screen surface obtaining section 3 at the first embodiment shown in FIG. 2. The image outputting section 14 outputs a corrected image from the image correcting section 12 and also adjusts the focus of the lens of the projection display unit in response to the control from the projection controlling section 15. The projection controlling section 15 controls the focal distance of the lens of the projection display unit in the image outputting section 14.

The basic structure of the second embodiment is almost the same as the first embodiment, however, the second embodiment provides the projection controlling section 15 and the focal distance of the lens of the projection display unit in the image outputting section 14 can be adjusted.

Referring to FIG. 6, operation of the second embodiment of the projection display unit of the present invention is explained. An original image is inputted to the image inputting section 11, and the image correcting section 12 applies a distortion correction to the inputted original image by using information from the screen surface obtaining section 13. At this time, the screen surface obtaining section 13 calculates three parameters being an azimuth angle, a tilt angle, and a distance by measuring the three dimensional shape of the screen surface. The projection controlling section 15 calculates the focal distance to be set to the variable focal distance lens of the projection display unit in response to the distance from the center of the projection display unit to the center of the screen surface obtained at the screen surface obtaining section 13. With this, the image outputting section 14 makes the focal distance of the lens of the projection display unit change and outputs the image corrected at the image correcting section 12. The focal distance calculated at the projection controlling section 15 can be also used at the tilt angle correction at the step S104 at the first embodiment that has the fixed focal distance.

In case that the distance from the projection display unit to the screen surface is changed to exceed the depth of focus of the lens of the projection display unit, the image on the screen surface is blurred, therefore, the focus of the lens of the projector display unit must be adjusted. At the second embodiment, the projection controlling section 15 calculates the focal distance suitable for the image outputting section 14 by using the distance from the center of the projection display unit to the center of the screen surface calculated at the screen surface obtaining section 13. By using this calculated focal distance, the image outputting section 14 adjusts the focus of the lens of the projection display unit, therefore, even when the distance from the projection display unit to the screen surface is changed, the image on the screen surface is not blurred.

Next, a third embodiment of the projection display unit of the present invention is explained. FIG. 7 is a block diagram showing the third embodiment of the projection display unit of the present invention. As shown in FIG. 7, the third embodiment of the projection display unit of the present invention consists of an image inputting section 21, a screen surface obtaining section 23, an image outputting section 24, a virtual approximate screen surface generating section 26, and a perspective projection section 27. The functions of the image inputting section 21, the screen surface obtaining section 23, and the image outputting section 24 are the same as those of the image inputting section 1, the screen surface obtaining section 3, and the image outputting section 4 at the first embodiment shown in FIG. 2. The virtual approximate screen surface generating section 26 generates a virtual approximate screen surface from the screen shape calculated at the screen surface obtaining section 23. The perspective projection section 27 calculates a corrected image by applying texture mapping to a normal original image on the virtual approximate screen surface and applying the perspective projection to the image and executing an inverse projection simulation for the image to be displayed on the screen surface from the projection display unit.

The third embodiment of the present invention is almost the same as the first embodiment, however, the third embodiment provides the virtual approximate screen surface generating section 26 and the perspective projection section 27 instead of the image correcting section 2 at the first embodiment.

Referring to FIG. 7, operation of the third embodiment of the projection display unit of the present invention is explained. When an original image is inputted to the image inputting section 21, the virtual approximate screen surface generating section 26 generates a virtual approximate screen surface by using the screen shape calculated at the screen surface obtaining section 23. In this, the virtual approximate screen surface is a screen surface that is natural from the view point of a user. The virtual approximate screen surface passes through the center of the screen surface, and the horizontal constituent of the normal line vector of the virtual approximate screen surface is the same as that of the normal line vector of the screen surface and the normal line vector of the virtual approximate screen surface is parallel to the floor surface.

Figure 8:
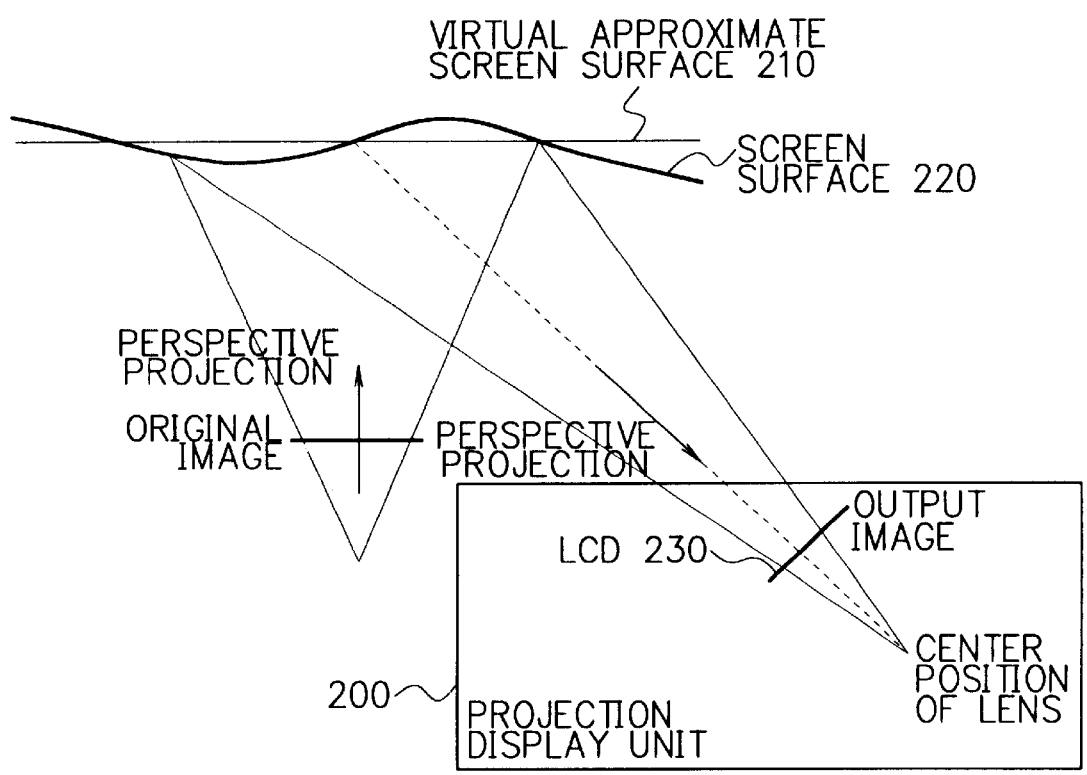
FIG. 8 is a diagram showing operation of a perspective projection section in the third embodiment of the projection display unit of the present invention.

FIG. 8 is a diagram showing operation of the perspective projection section 27 in the third embodiment of the projection display unit of the present invention. Referring to FIG. 8, the operation of the perspective projection section 27 is explained. The perspective projection section 27 sets a perspective projection model so that an original image can be displayed normally on the generated virtual approximate screen surface 210 and simulates that the original image is projected on the virtual approximate screen surface 210. By this projection simulation, an image to be projected on the screen surface 220 is obtained.

Further, a perspective projection model, in which an outputted image from the projection display unit 200 is displayed on the screen surface 220, is set. And inverting projection simulation is applied to the image displayed on the screen surface 220, and a corrected image to be outputted is obtained on a LCD panel 230 in the projection display unit 200. The image outputting section 24 outputs the image corrected by this operation.

The process of the perspective projection is a well-known process in a three dimensional computer graphics, and a high speed processing circuit for this process has been already widely used. Therefore, at the third embodiment of the present invention, this circuit is used, and at the same time by controlling fineness or roughness of the virtual approximate screen surface, the high speed correction process can be realized.

As mentioned above, at the third embodiment of the present invention, when the screen has an irregular surface or a free surface, an approximate surface being a virtual screen surface is calculated. With this, as the same as the screen has a regular surface, by applying only the perspective projection process, even when an image is projected from an arbitrary direction, a distortion corrected image can be projected.

Figure 9:
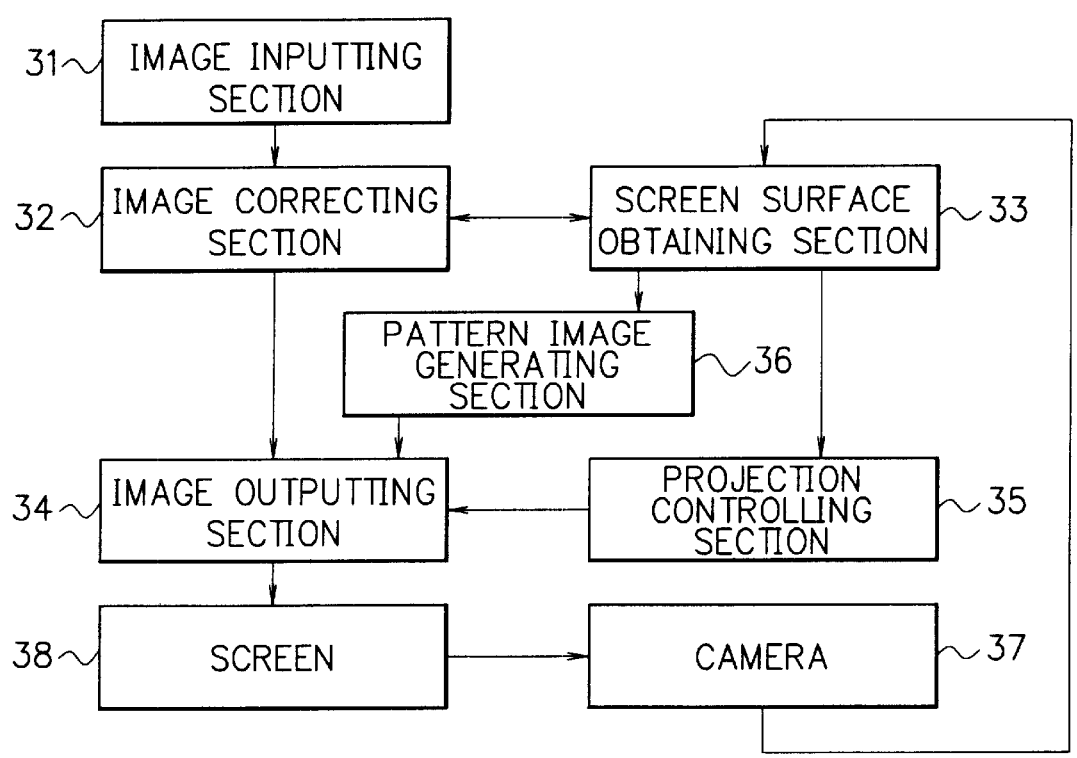
FIG. 9 is a block diagram showing a fourth embodiment of the projection display unit of the present invention.
Figure 10:
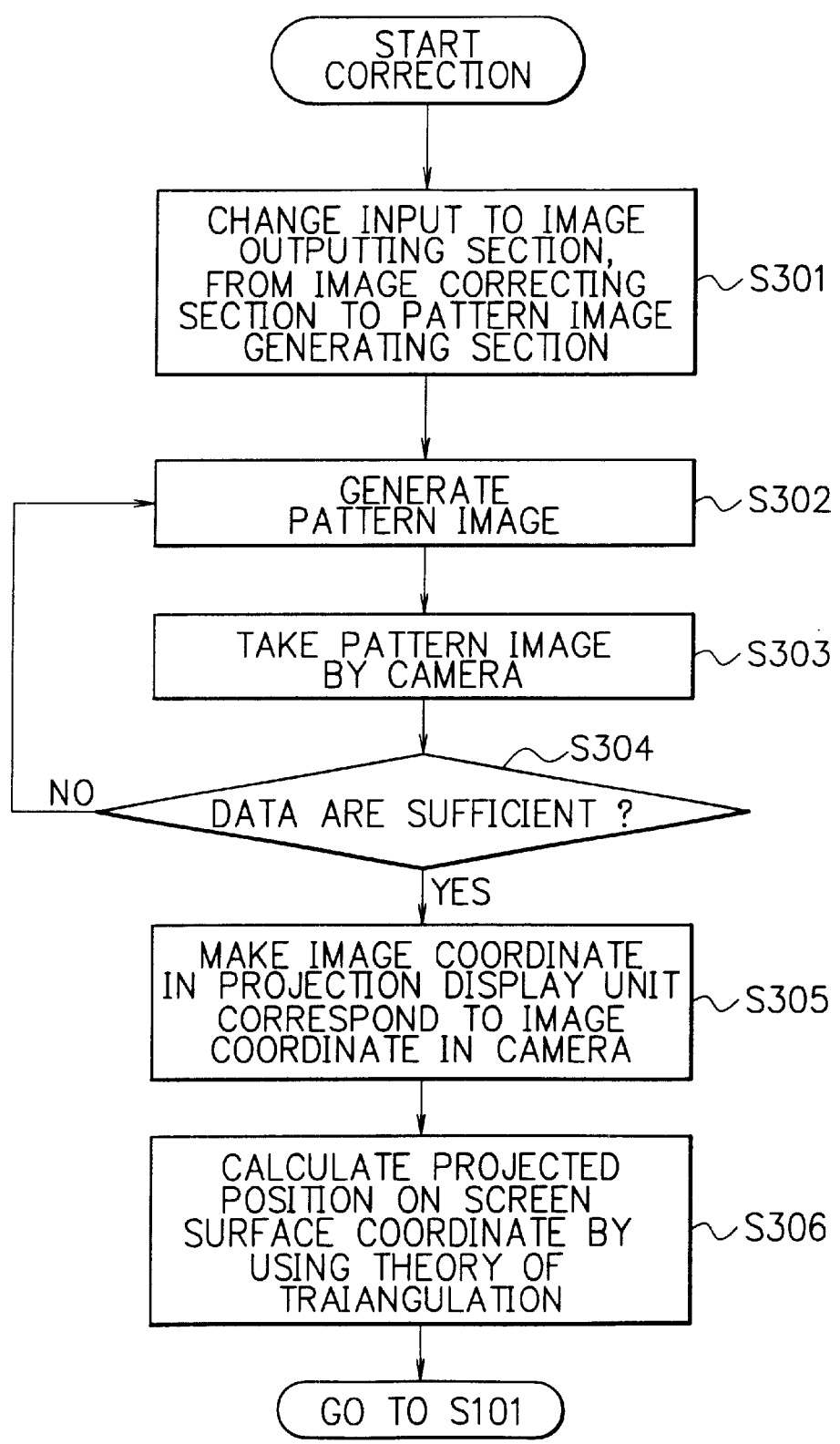
FIG. 10 is a flowchart showing screen surface coordinate position calculating processes in correction operation of the fourth embodiment of the projection display unit of the present invention.

Next, a fourth embodiment of the projection display unit of the present invention is explained. FIG. 9 is a block diagram showing the fourth embodiment of the projection display unit of the present invention. FIG. 10 is a flowchart showing screen surface coordinate position calculating processes in correction operation of the fourth embodiment of the projection display unit of the present invention.

As shown in FIG. 9, the fourth embodiment of the projection display unit of the present invention consists of an image inputting section 31, an image correcting section 32, a screen surface obtaining section 33, an image outputting section 34, a projection controlling section 35, a pattern image generating section 36, a camera 37, and a screen 38. Generally, a projection display unit does not provide a screen inside the projection display unit, however, at the fourth embodiment, the screen 38 is provided in the projection display unit. The functions of the image inputting section 31 and the image correcting section 32 are the same as those of the image inputting section 1 and the image correcting section 2 in the first embodiment shown in FIG. 2.

The screen surface obtaining section 33 calculates a shape of the screen 38 by using the theory of triangulation based on an image from the camera 37 that took pattern images. The image outputting section 34 outputs a corrected image from the image correcting section 32 or the pattern image from the pattern image generating section 36. The projection controlling section 35 controls to change images inputting to the image outputting section 34. The pattern image generating section 36 generates the pattern images. The camera 37 takes the screen 38 from the different direction from the projection display unit.

This fourth embodiment has almost the same basic structure as the first embodiment has. However, the fourth embodiment has flexibility at the processes in the screen surface obtaining section 33 by using an optical triangulation method.

Referring to FIG. 9, operation of the fourth embodiment of the projection display unit of the present invention is explained.

When an original image is inputted to the image inputting section 31, the image correcting section 32 corrects the original image by using data from the screen surface obtaining section 33. At this time, the screen surface obtaining section 33 calculates the shape of the screen surface by applying the theory of triangulation to a point in the image coordinate of the projection display unit and a corresponding point to a camera image taken the pattern by using the information of the pattern image from the camera 37 and obtaining a three dimensional coordinate of the position where the point is projected. The image outputting section 34 outputs the corrected image from the image correcting section 32 or the pattern image from the pattern image generating section 36 by changing these images based on a control of the projection controlling section 35. The projection controlling section 35 controls to change the input to the image outputting section 34 by using the corrected image from the image correcting section 32 or the pattern image from the pattern image generating section 36. The image on the screen 38 projected from the image outputting section 34 is transmitted to the screen surface obtaining section 33 via the camera 37, and the screen surface obtaining section 33 calculates the shape of the screen 38 as mentioned above.

Referring to FIG. 10, screen coordinate position calculating processes in correction operation of the fourth embodiment of the projection display unit of the present invention are explained. First, when the correction operation is started, the input to the image outputting section 34 is changed from the image correcting section 32 to the pattern image generating section 36 (step S301). Next, a pattern image is generated at the pattern image generating section 36 (step S302). The pattern image on the screen 38 outputted from the image outputting section 34 is taken by the camera 37 (step S303). At the screen surface obtaining section 33, it is investigated that to which corresponding point on the camera image coordinate a point on the image coordinate in the projection display unit corresponds based on the pattern image taken by the camera 37, and the two points are made to correspond (step S305). Further, by using the theory of triangulation, the three dimensional coordinate of the projected position of the point on the screen 38 is calculated (step S306).

This kind of method measuring the three dimensional position of an object is well-known as the optical triangulation method. When the sufficient number of coordinate positions is not obtained by only one time pattern taking, at step S304, the processes from the step S302 to the step S304 are repeated, and the required number of the coordinate positions on the screen is calculated. After completing the calculation of the coordinate positions on the screen, the process goes to the step S101 in FIG. 3.

As mentioned above, at the fourth embodiment of the present invention, by utilizing a general-purpose camera, as the same as the first embodiment, even when an image is projected on the screen surface from an arbitrary direction, an image whose distortion is corrected can be projected. And even when the screen has an irregular surface or a free surface, the distortion of the displaying image can be corrected.

Figure 11:
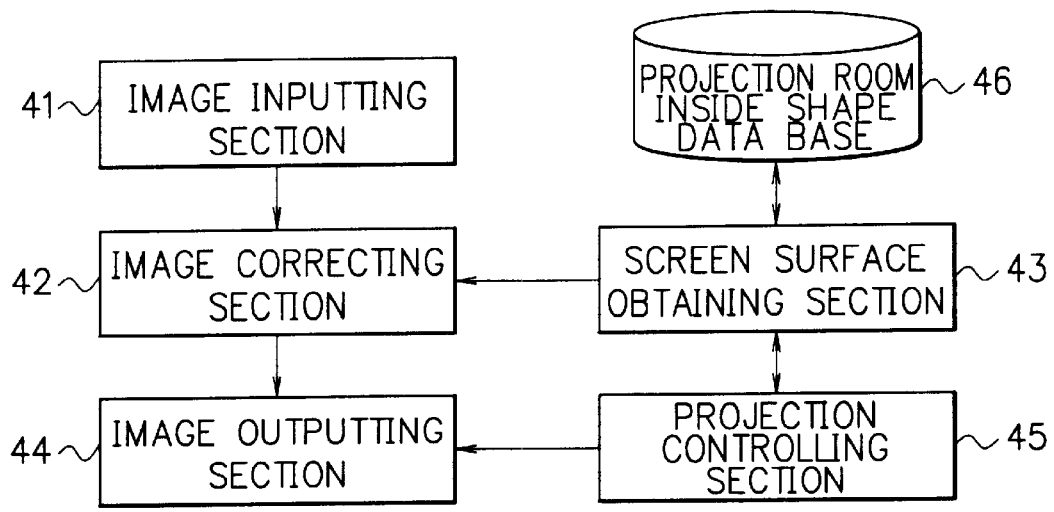
FIG. 11 is a block diagram showing a fifth embodiment of the projection display unit of the present invention.
Figure 12:
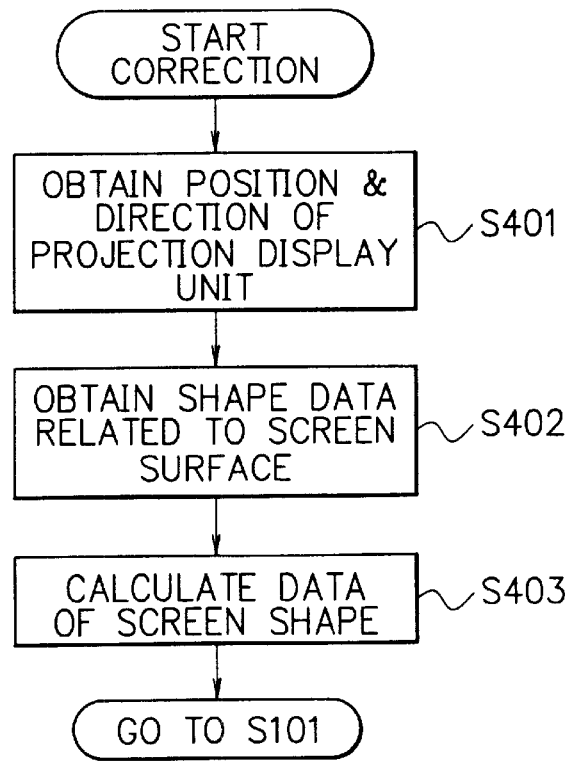
FIG. 12 is a flowchart showing screen shape data calculating processes in correction operation of the fifth embodiment of the projection display unit of the present invention.

Next, a fifth embodiment of the projection display unit of the present invention is explained. FIG. 11 is a block diagram showing the fifth embodiment of the projection display unit of the present invention. FIG. 12 is a flowchart showing screen shape data calculating processes in correction operation of the fifth embodiment of the projection display unit of the present invention.

As shown in FIG. 11, the fifth embodiment of the projection display unit of the present invention consists of an image inputting section 41, an image correcting section 42, a screen surface obtaining section 43, an image outputting section 44, a projection controlling section 45, and a projection room inside shape data base 46. The functions of the image inputting section 41, the image correcting section 42, and the image outputting section 44 are the same as those of the image inputting section 1, the image correcting section 2, the image outputting section 4 in the first embodiment shown in FIG. 2. The screen surface obtaining section 43 obtains information of the shape data inside the projection room to which an image is projected from the projection room inside shape data base 46. The projection controlling section 45 controls the position and direction of the projection display unit in the projection room. The projection room inside shape data base 46 stores the shape data of the projection room, in which the image is projected, beforehand.

The basic structure of the fifth embodiment is almost the same as that of the first embodiment. However, at the fifth embodiment, the projection room inside shape data base 46 is provided, and the shape data of the projection room in which the image is projected are stored beforehand, therefore, the processes at the screen surface obtaining section 43 can be simplified.

Referring to FIG. 11, operation of the fifth embodiment of the projection display unit of the present invention is explained. When an original image is inputted to the image correcting section 42 from the image inputting section 41, the image correcting section 42 corrects the original image by using data from the screen surface obtaining section 43. At the time when the correction process is started, the screen surface obtaining section 43 obtains the data of the position and direction of the projection display unit in the projection room from the projection controlling section 45 and also obtains the shape data related to the screen surface in the projection room from the projection room inside shape data base 46. The screen surface obtaining section 43 obtains the shape of the screen surface by converting the shape data of this screen to the coordinate in the projection display unit coordination. The image correcting section 42 corrects the original image in response to the shape data of this screen surface. With this, the image outputting section 44 outputs the corrected image. At this time, the projection controlling section 45 controls the position and direction of the projection display unit in the projection room in which the image is projected.

Referring to FIG. 12, the screen shape data calculating processes in correction operation of the fifth embodiment of the projection display unit of the present invention is explained.

At the time when the correction process is started, the screen surface obtaining section 43 obtains the data of the position and direction of the projection display unit from the projection controlling section 45 (step S401). The screen surface obtaining section 43 obtains the shape data related to the screen surface in the projection room from the projection room inside shape data base 46 (step S402). The screen surface obtaining section 43 converts the shape data of this screen surface to the coordinate in the projection display unit coordinate, and calculates the data of the screen shape (step S403). After completing the calculation of the data of the screen shape, the process goes to the step S101 in FIG. 3 at the first embodiment.

As mentioned above, at the fifth embodiment of the projection display unit of the present invention, the screen shape is obtained by converting the data stored beforehand, therefore, the process can be simplified and the high speed processing can be realized.

Figure 13:
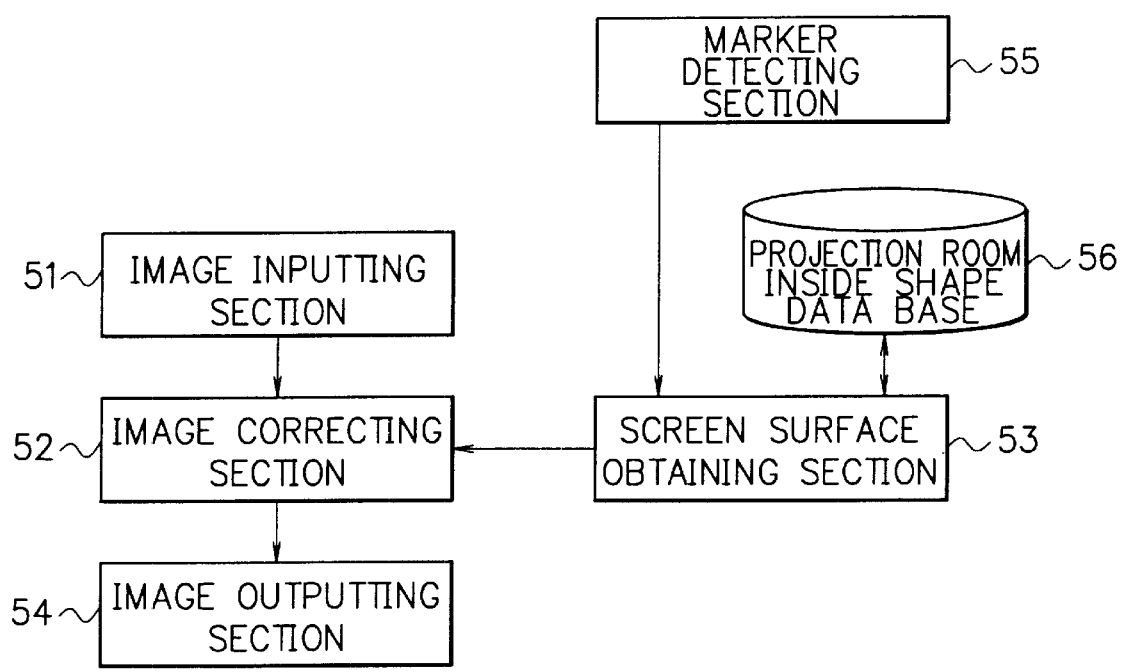
FIG. 13 is a block diagram showing a sixth embodiment of the projection display unit of the present invention.

Next, a sixth embodiment of the projection display unit of the present invention is explained. FIG. 13 is a block diagram showing the sixth embodiment of the projection display unit of the present invention.

As shown in FIG. 13, the sixth embodiment of the projection display unit of the present invention consists of an image inputting section 51, an image correcting section 52, a screen surface obtaining section 53, an image outputting section 54, a marker detecting section 55, and a projection room inside shape data base 56. The functions of the image inputting section 51, the image correcting section 52, and the image outputting section 54 are the same as those of the image inputting section 1, the image correcting section 2, and the image outputting section 4 in the first embodiment shown in FIG. 2. The screen surface obtaining section 53 obtains the shape data inside the projection room to which an image is projected from the projection room inside shape data base 56 and also obtains marker detecting information from the maker detecting section 55. The marker detecting section 55 detects markers provided inside the projection room. The projection room inside shape data base 56 stores the shape data of the projection room in which the image is projected beforehand.

The basic structure of the sixth embodiment is almost the same as that of the first embodiment. However, at the sixth embodiment, the projection room inside shape data base 56 is provided and the shape data of the projection room in which the image is projected are stored beforehand. Further, the marker detecting section 55 is also provided and the data of the position and direction of the projection display unit are obtained by detecting the markers provided inside the projection room, therefore, the process at the screen surface obtaining section 53 can be simplified.

Referring to FIG. 13, operation of the sixth embodiment of the projection display unit of the present invention is explained. When an original image is inputted to the image correcting section 52 from the image inputting section 51, the image correcting section 52 corrects the original image by using data from the screen surface obtaining section 53. At the time when the image correction is started, the marker detecting section 55 obtains the position and direction of the projection display unit by observing, for example, markers being identifiers (IDs) stuck on the walls of the projection room by using sensors (not shown) provided in the projection display unit. The screen surface obtaining section 53 obtains the position and direction of the projection display unit from the marker detecting section 55 and also obtains a shape data related to the screen surface in the projection room from the projection room inside shape data base 56. And the screen surface obtaining section 53 obtains the shape of the screen surface by converting the shape data of the screen to the coordinate in the projection display unit coordinate based on the data of the position and direction of the projection display unit. The image correcting section 52 corrects the original image based on these data of the shape data of the screen surface, and the image outputting section 54 outputs the corrected image.

As mentioned above, at the sixth embodiment of the projection display unit of the present invention, the data of the position and direction of the projection display unit in the projection room are obtained by using the markers instead of controlling the position and direction of the projection display unit at the fifth embodiment. And detecting markers can be realized by small sensors, therefore, the projection display unit can be small sized and light weighted.

The embodiments of the present invention are explained above by referring to the drawings, however, the embodiments are not limited to the embodiments mentioned above. For example, at the second embodiment, by making the lens of the projection display unit a fixed focal distance instead of the variable focal distance, the focus can be adjusted by changing the position of the LCD panel in the projection display unit. And at the sixth embodiment, markers can be stuck on the projection display unit itself instead of sticking the makers on the walls of the projection room, and it becomes possible that the markers are observed by the sensors provided in the projection room. And at the first embodiment, the image correcting section 2 executes the zooming correction first, and after this, the inclination correction is executed, however the image correcting section 2 executes the inclination correction first, and after this, the zooming correction can be executed. Further, a laser diode can be used instead of using the LCD panel.

As mentioned above, according to the projection display unit of the present invention, in case that an image is projected on a screen surface from an arbitrary direction, a distortion of the image can be corrected, and also a distortion of the image which is projected on an irregular surface or a free surface can be corrected. These can be realized by that the distortions of the image are corrected corresponding to the shape of the screen surface.

And a focus of the projection display unit can be adjusted. This can be realized by that the focal distance of the lens of the projection display unit is controlled by that the distance between the projection display unit and the screen surface is measured.

And a process correcting a distortion of an image can be executed in high speed. This can be realized by that a virtual approximate screen surface in response to the screen shape is generated and the distortion of the image is corrected by applying a perspective projection process to the virtual approximate screen surface.

And a process obtaining the shape of the screen surface can be executed by using a general-purpose camera. This can be realized by that the camera takes an image in which a pattern is projected on the screen surface, and the shape of the screen surface can be calculated by using the theory of triangulation.

And also a process obtaining the shape of the screen surface can be executed in high speed. This can be realized by that the position and direction data of the projection display unit in the projection room are obtained from a projection controlling section and also the shape data of the screen surface are obtained, and this shape data of the screen surface are converted to the coordinate of the projection display unit coordination, and the shape of the screen surface can be calculated.

And a shape obtaining device of the screen surface can be small sized and light weighted. This can be realized by that markers are stuck on the walls of the projection room beforehand, and these markers are observed form the projection display unit. With this, the position and direction of the projection display unit are calculated. Therefore, only by converting the shape data of the projection room that are stored beforehand, the shape of the screen surface can be calculated.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A projection display unit, comprising:
    an image inputting means to which an original image is inputted;
    a screen surface obtaining means for obtaining a three dimensional shape of a screen surface by calculating an azimuth angle, a tilt angle, and a distance of said screen surface for said projection display unit by using the normal line vector of said screen surface;
    an image correcting means for executing an inclination correction and a zooming in/out correction for said original image corresponding to said three dimensional shape of said screen surface; and
    an image outputting means for outputting the corrected image as a projecting image.

2. A projection display unit in accordance with claim 1, wherein:
    said inclination correction makes said original image rotate corresponding to the inclination of said screen surface, and also makes the size of said original image change corresponding to the ratio between said distance of said screen surface and a focal distance of lens of said projection display unit, and makes the coordinate of said original image projected on a tentative reference surface change corresponding to said distance and said inclination of said screen surface; and
    said zooming in/out correction makes the coordinate of said original image change corresponding to the ratio between the distance from the center of said projection display unit to a reference surface and the distance from the center of said projection display unit to said tentative reference surface.

3. A projection display unit in accordance with claim 1, further comprising:
    a projection controlling means which calculates said focal distance of said lens of said projection display unit corresponding to said distance of said screen surface calculated at said screen surface obtaining means and controls the focus in said image outputting means.

4. A projection display unit in accordance with claim 3, wherein:
    said inclination correction is executed by said focal distance calculated at said projection controlling means.

5. A projection display unit, comprising:
    an image inputting means to which an original image is inputted;
    a screen surface obtaining means for obtaining a three dimensional shape of a screen surface by calculating an azimuth angle, a tilt angle, and a distance of said screen surface for said projection display unit by using the normal line vector of said screen surface;
    a virtual approximate screen surface generating means for generating a virtual approximate screen surface by using said three dimensional shape of said screen surface calculated at said screen surface obtaining means;
    a perspective projection means for calculating a corrected image by orthographic projection of a three dimensional image which is obtained by that a projection simulation is applied to said inputted original image on said virtual approximate screen surface by a perspective projection process; and
    an image outputting means for outputting the corrected image as a projecting image.

6. A projection display unit in accordance with claim 5, wherein:
    said virtual approximate screen surface is obtained by that the coordinate of said screen surface is rotated by the inclination of said screen surface, and a directional vector of said coordinate from the center of said projection display unit is obtained, and an angle between said directional vector and an optical axis of said projection display unit is obtained, and a process for calculating three dimensional coordinate of the position of said virtual approximate screen surface of said coordinate is applied to all coordinates, and a three dimensional polygon connected each coordinate of said virtual approximate screen surface is generated.

7. A projection display unit, comprising:
    an image inputting means to which an original image is inputted;
    an image outputting means which outputs an image that said original image is processed as a projecting image;
    a projection controlling means which changes over an image inputting to said image outputting means;

a pattern image generating means which generates pattern images and outputs said pattern images;

a screen surface obtaining means which obtains a shape of a screen surface by that by using said pattern images and images on said screen surface at the time when said pattern images are inputted to said image outputting means and are taken by a camera, and by obtaining three dimensional coordinates of the positions projected said pattern images by using a triangulation method with making the coordinate of said projection display unit correspond to the coordinate of camera images being said pattern images taken; and an image correcting means which executes an inclination correction and a zooming in/out correction for said inputted original image corresponding to said shape of said screen surface and inputs said corrected image to said image outputting means.

8. A projection display unit, comprising:

an image inputting means to which an original image is inputted;

an image outputting means which outputs an image that said original image is processed as a projecting image;

a projection controlling means which has data of the position and direction of said projection display unit in a projection room and controls said data;

a projection room inside shape data base in which shape data inside the projection room are stored;

a screen surface obtaining means which obtains a shape of a screen surface by converting said shape data inside projection room obtained from said projection room inside shape data base corresponding to said position and direction data of said projection display unit; and an image correcting means which executes an inclination correction and a zooming in/out correction for said inputted original image corresponding to said shape of said screen surface and inputs said corrected image to said image outputting means.

9. A projection display unit, comprising:

an image inputting means to which an original image is inputted;

an image outputting means which outputs an image that said original image is processed as a projecting image;

a marker detecting means for detecting markers provided inside a projection room;

a projection room inside shape data base in which shape data inside the projection room are stored;

a screen surface obtaining means which obtains a shape of a screen surface by converting said shape data inside projection room obtained from said projection room inside shape data base corresponding to said position and direction data of said projection display unit based on a detected result at said marker detecting means; and an image correcting means which executes an inclination correction and a zooming in/out correction for said inputted original image corresponding to said shape of said screen surface and inputs said corrected image to said image outputting means.

10. A projection display unit, comprising:

an image inputting means to which an original image is inputted;

an image outputting means which outputs an image that said original image is processed as a projecting image;

a marker detecting means for detecting markers provided at said projection display unit itself;

a projection room inside shape data base in which shape data inside the projection room are stored;

a screen surface obtaining means which obtains a shape of a screen surface by converting said shape data inside projection room obtained from said projection room inside shape data base corresponding to said position and direction data of said projection display unit based on a detected result at said marker detecting means; and an image correcting means which executes an inclination correction and a zooming in/out correction for said inputted original image corresponding to said shape of said screen surface and inputs said corrected image to said image outputting means.

* * * * *